United States Patent [19]

Determan

[11] Patent Number: 5,190,459
[45] Date of Patent: Mar. 2, 1993

[54] CHILD'S BEHAVIORAL CALENDAR APPARATUS

[76] Inventor: Jeffery B. Determan, 17290 County Rd. #291, Nathrop, Colo. 81236

[21] Appl. No.: 819,979

[22] Filed: Jan. 13, 1992

[51] Int. Cl.⁵ .................. G09B 19/00; G06C 1/00
[52] U.S. Cl. ............................ 434/238; 434/203; 434/236
[58] Field of Search ............ 434/238, 236, 203, 304

[56] References Cited

U.S. PATENT DOCUMENTS

| | | | |
|---|---|---|---|
| 580,516 | 4/1897 | Andrew | 434/203 |
| 2,918,730 | 12/1959 | Schrade | 434/238 |
| 3,473,239 | 10/1969 | Noseworthy | 434/238 |
| 4,776,799 | 10/1988 | Walsh | 434/238 |

FOREIGN PATENT DOCUMENTS 920271  4/1947  France ................ 434/203

Primary Examiner—John J. Wilson
Assistant Examiner—Cindy A. Cherichetti
Attorney, Agent, or Firm—Leon Gilden

[57] ABSTRACT

A behavioral calendar structure is arranged to include a support plate mounting an upper housing and lower housing thereto. The upper housing includes a first "W" shaped loop to accommodate one counting sphere for each day per week. A second inverted "U" shaped loop mounted to the second housing includes second spheres to accommodate four more spheres to indicate a corresponding number of misbehaviors of a number of days per week. A total of four more displacements of the second spheres effects the displacement in a week of one of a third sphere of a third loop to indicate a single week's behavior. Misbehavior of three or more such spheres effects displacement of the "W" shaped spheres to indicate in a calendar year the number of months of misbehavioral activity. A fourth inverted "U" shaped loop mounted to the second housing is arranged for calendar months corresponding movement of a single sphere per month to indicate whether a child has misbehaved a greater number of months and the current calendar month as indicated by the fourth loop. A modification of the invention includes the first and fifth "W" shaped loops formed of a translucent material to effect illumination of the loop for enhanced visibility as well as illumination of the pictorial designations rearwardly of the distal ends of each of the first and fifth loops.

1 Claim, 4 Drawing Sheets

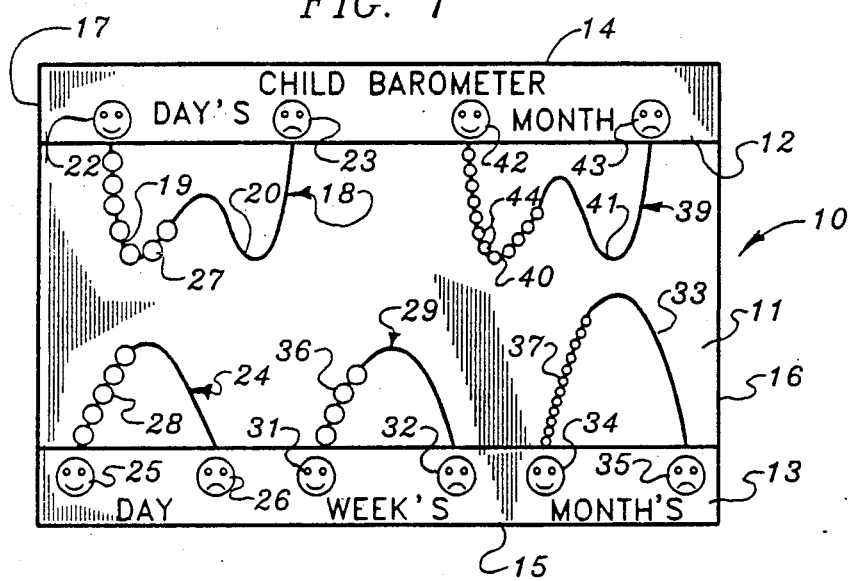
FIG. 1
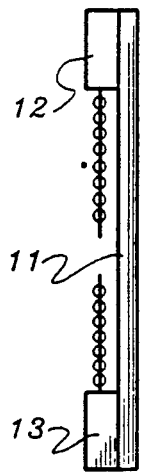
FIG. 2
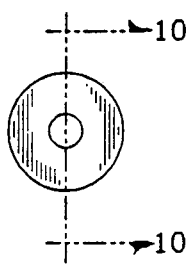
FIG. 3
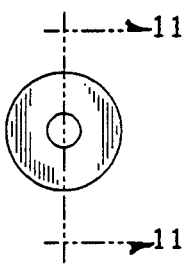
FIG. 4
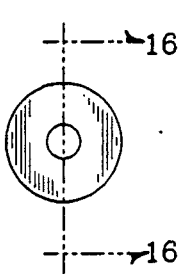
FIG. 9
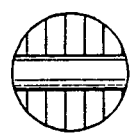
FIG. 10
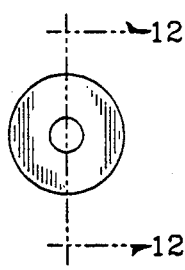
FIG. 5
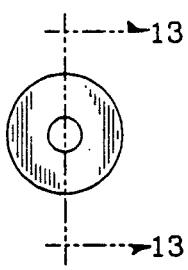
FIG. 6
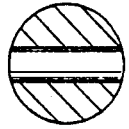
FIG. 12
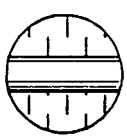
FIG. 11
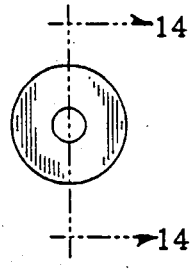
FIG. 7
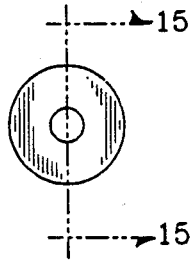
FIG. 8
FIG. 14
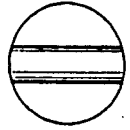
FIG. 15
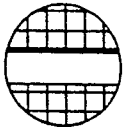
FIG. 16
FIG. 13

CHILD'S BEHAVIORAL CALENDAR APPARATUS

BACKGROUND OF THE INVENTION

1. Field of the Invention

The field of invention relates to child's behavioral control devices, and more particularly pertains to a new and improved child's behavioral calendar apparatus wherein the same is arranged to indicate degree of behavior or misbehavior of a child per a given time frame.

2. Description of the Prior Art

Various calendar devices are utilized throughout the prior art as teaching and learning devices and are exemplified by the U.S. Pat. Nos. 4,862,505 to Keith, et al; 4,783,922 to Moore; 3,702,507 to Romey; 4,863,386 to Maxey; and 4,128,990 to Phillips to effect the calculation of various teaching and learning components such as calendar days.

As such, it may be appreciated that there continues to be a need for a new and improved child's behavioral calendar apparatus as set forth by the instant invention which addresses both the problems of ease of use as well as effectiveness in construction in effecting a behavioral marking of various child's behavioral events and in this respect, the present invention substantially fulfills this need.

SUMMARY OF THE INVENTION

In view of the foregoing disadvantages inherent in the known types of calendar apparatus now present in the prior art, the present invention provides a child's behavioral calendar apparatus wherein the same is arranged for the visual indication of a child's misbehavior in an effort to effect positive change thereto. As such, the general purpose of the present invention, which will be described subsequently in greater detail, is to provide a new and improved child's behavioral calendar apparatus which has all the advantages of the prior art calendar apparatus and none of the disadvantages.

To attain this, the present invention provides a behavioral calendar structure arranged to include a support plate mounting an upper housing and lower housing thereto. The upper housing includes a first "W" shaped loop to accommodate one counting sphere for each day per week. A second inverted "U" shaped loop mounted to the second housing includes second spheres to accommodate four more spheres to indicate a corresponding number of misbehaviors of a number of days per week. A total of four more displacements of the second spheres effects the displacement in a week of one of a third sphere of a third loop to indicate a single week's behavior. Misbehavior of three or more such spheres effects displacement of the "W" shaped spheres to indicate in a calendar year the number of months of misbehavioral activity. A fourth inverted "U" shaped loop mounted to the second housing is arranged for calendar months corresponding movement of a single sphere per month to indicate whether a child has misbehaved a greater number of months and the current calendar month as indicated by the fourth loop. A modification of the invention includes the first and fifth "W" shaped loops formed of a translucent material to effect illumination of the loops for enhanced visibility as well as illumination of the pictorial designations rearwardly of the distal ends of each of the first and fifth loops.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope and the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child's behavioral calendar apparatus which has all the advantages of the prior art calendar apparatus and none of the disadvantages.

It is another object of the present invention to provide a new and improved child's behavioral calendar apparatus which may be easily and efficiently manufactured and marketed.

It is a further object of the present invention to provide a new and improved child's behavioral calendar apparatus which is of a durable and reliable construction.

An even further object of the present invention is to provide a new and improved child's behavioral calendar apparatus which is susceptible of a low cost of manufacture with regard to both materials and labor, and which accordingly is then susceptible of low prices of sale to the consuming public, thereby making such child's behavioral calendar apparatus economically available to the buying public.

Still yet another object of the present invention is to provide a new and improved child's behavioral calendar apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1, is an orthographic view, taken in elevation of the instant invention.

FIG. 2, is an orthographic side view of the instant invention.

FIGS. 3, 4, 5, 6, 7, 8, and 9 are orthographic views of variously colored indicator spheres utilized by the invention.

FIGS. 10, 11, 12, 13, 14, 15, and 16 are illustrative cross-sectional illustrations to indicate various colorations of the spheres of the FIGS. 3-9 respectively.

DESCRIPTION OF THE PREFERRED EMBODIMENT

Figure 17:
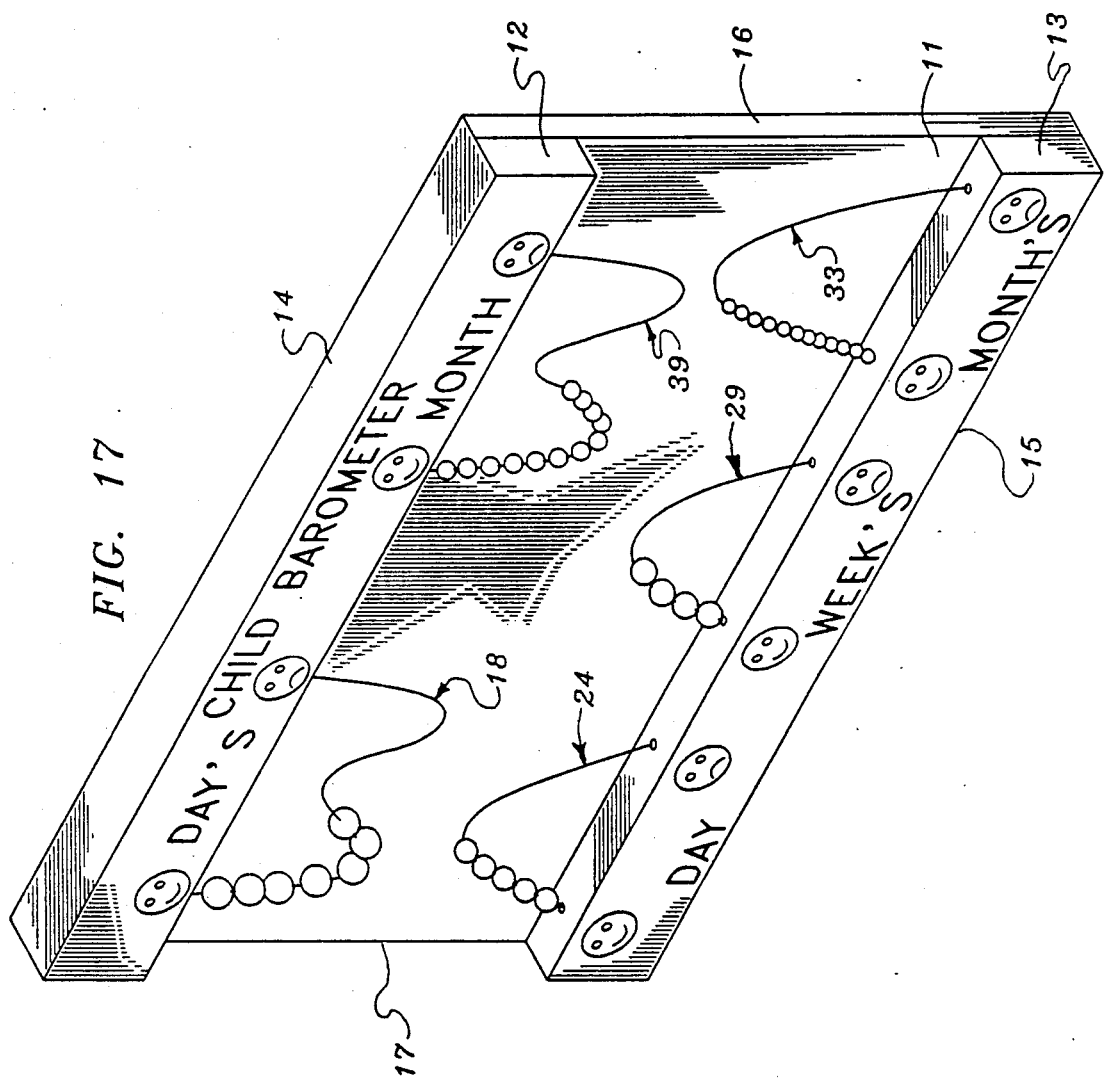
FIG 17, is an isometric illustration of the instant invention.

With reference now to the drawings, and in particular to FIGS. 1 to 20 thereof, a new and improved child's behavioral calendar apparatus embodying the principles and concepts of the present invention and generally designated by the reference numerals 10 and 10a will be described.

More specifically, the child's behavioral calendar apparatus 10 of the instant invention essentially comprises a support plate 11 including an upper housing 12 spaced from and parallel a lower housing 13. The upper housing 12 is arranged in contiguous communication relative to the support plate top edge 14 extending from a right side 16 to a left side 17. Similarly, the lower housing 13 extends in contiguous communication with the support plate bottom edge 15 extending coextensively between the right side 16 and the left side 17.

A first loop 24 of a generally inverted "U" shaped configuration is mounted at each distal end to the bottom housing 13, with the first loop 24 including a first end pictorial plate 25 and a second end pictorial plate 26 indicative of acceptable and unacceptable behavior respectively. First loops spheres 28 are slidably mounted along the first loop 24. In this manner, the first loop is indicative of the number of days of a week a child has behaved in an unacceptable manner, whereupon displacement of four or more of the first loop spheres 28 from a position adjacent the first pictorial plate 25 to the second pictorial plate 26, a second loop sphere 27 is displaced from a first position within a first trough 19 of the second loop to a second through 20 of the second loop, wherein the second loop is of a generally "W" shaped configuration as illustrated and extends from a second loop first end pictorial plate to a second loop second end pictorial plate 22 and 23 respectively. Should a child within a week or seven days indicated by the seven spheres of the second loop 18 be assessed of improper behavior, a third loop sphere 36 is displaced along a third loop 29 of a generally "U" shaped inverted configuration from a third loop first end pictorial plate 31 to a third loop second pictorial plate 32.

Should there be three of more such improper weeks of behavior within a given month, a fourth loop sphere 37 is displaced along the fourth loop 33 of a "U" shaped inverted configuration from adjacent the fourth loop first pictorial plate 34 to the fourth loop second pictorial plate 35. A fifth "W" shaped loop 39 mounted extending downwardly from the first housing 12 includes a fifth loop first trough and a fifth loop second trough 40 and 41 respectively. The fifth loop spheres 44 are displaceable from the first end 42 to the second end 43, and more specifically from the first trough 40 to the second trough 41, wherein twelve such fifth loop spheres are provided to indicate the number of months having been traversed in the year. In this manner, an individual may access the number of spheres 37 displaced in the fourth loop relative to the number of spheres displaced in the fifth loop, whereupon it is desirable that at least a greater number of spheres be passed by the fifth loop to indicate that a child's behavior is not acceptable in every month of the year and in this manner, improvement in the child's behavior is encouraged.

Variously colored spheres may be utilized in the various loops of the organization to provide for a contrasting coloration to enhance attraction and understanding by a child. The FIGS. 3-9 and the associated cross-sections 10-16 are indicative of possible colorations utilized but not to be limited thereto.

Figure 18:
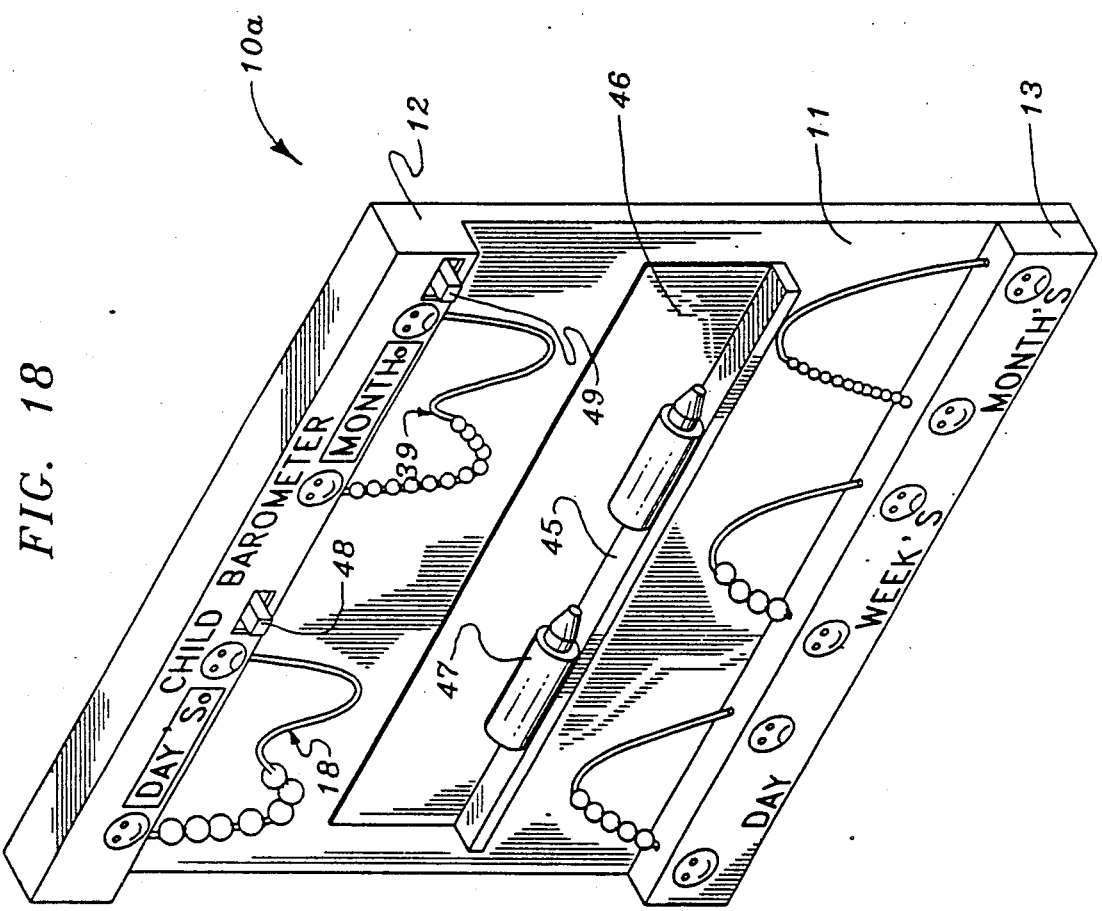
FIG. 18, is an isometric illustration of a modification of the invention.
Figures 19, 20:
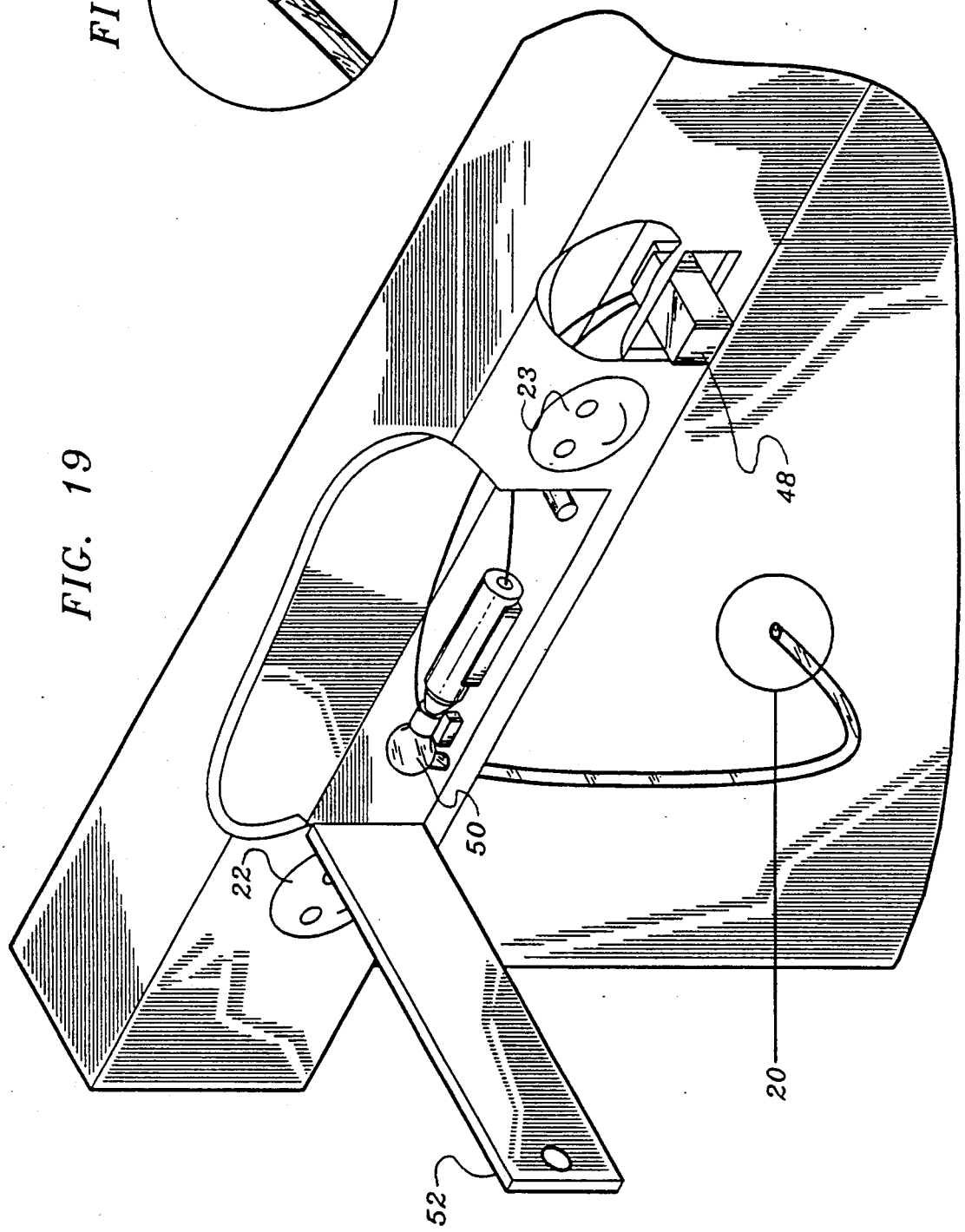
FIG. 19, is an enlarged partial sectional view, taken in isometric illustration, of the upper housing structure.
FIG. 20, is an enlarged isometric illustration of section 20 as set fourth in FIG. 19.

The FIG. 18 illustrates a modified apparatus 10a to include a support plate 45 mounting a plurality of writing instruments 47 thereon, wherein an erasable polymeric note plate 46 extends upwardly and orthogonally relative to the support plate 45 for indications and notation of various types of behavior that is undesirable and corrective measures that a child has agreed to accept to be written on the note plate 46. Further, a first and second on/off switch 48 and 49 are provided within the first housing to operate respective illumination bulbs 50 therewithin (see Fig. 19). The first and fifth "W" shaped loops 18 and 39 are of a tubular, hollow, translucent construction, whereupon illumination of the illumination bulbs 50, illumination is thusly transferred into the translucent tubes 18 and 39 for projection along the tubes, wherein it is hoped that a greater degree of illumination is effected relative to the second pictorial plate 23 as the pictorial plates 22 and 23 are of a translucent construction to indicate the acceptable and unacceptable behavioral sides of the loop 18. The upper housing 12 is hollow to contain the various components in the illumination within the housing 12 for illumination of the tubular loops 18 and 39, as well as the first and second pictorial plates 22 and 23 of the first loop.

The door plate 52 is pivotally mounted through a forward wall of the upper housing 12 to permit access and maintenance of the illumination bulb 50 and the associated battery member therewithin the housing 12 adjacent the door plate 52.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A child's behavioral calendar apparatus, comprising in combination,
   a support plate, the support plate including a top edge spaced from and parallel a bottom edge, and a right side spaced from and parallel a left side,
   and
   an upper housing in contiguous communication with the top edge extending coextensively between the right side and the left side,
   and
   a lower housing in contiguous communication with the bottom edge extending coextensively between the right side and the left side, wherein the upper housing is spaced from and parallel the lower housing,
   and
   a first inverted "U" shaped loop mounted to the lower housing between the lower housing and the upper housing adjacent the support plate, wherein the first loop includes a first end and second end mounted to the lower housing, and includes a plurality of first loop spheres slidably receiving the first loop therethrough, wherein the first loop spheres are displaceable from the first loop to indicate a number of a child's misbehavioral activities per day,
   and
   a second "W" shaped support loop mounted to the upper housing extending below the upper housing adjacent the support plate, wherein the second "W" shaped support loop includes a first trough and a second trough, and includes a plurality of second loop spheres displaceable from the first trough slidably along the second loop to the second trough for indication of improper behavior in the second trough relative to acceptable behavior relative to the first trough,
   and
   a third inverted "U" shaped loop mounted to the second housing adjacent the first loop, wherein the third loop includes at least four third loop spheres for indication of a number of weeks of misbehavior per monthly time frame,
   and
   a fourth loop of a generally "U" shaped configuration mounted to the lower housing adjacent the third loop, wherein the fourth loop includes twelve fourth loop spheres, wherein each fourth loop sphere is arranged for indication of a month of twelve months of a calendar year, whereupon displacement of a fourth loop sphere from a first end of the fourth loop to a second end of the fourth loop is arranged for counting a number of months traversed in the calendar year,
   and
   a fifth loop, the fifth loop of a generally "W" shaped configuration mounted to the upper housing adjacent the second loop, wherein the fifth loop includes a fifth loop first trough and a fifth loop second trough, wherein twelve fifth loop spheres are slidably mounted to the fifth loop and initially positioned within the first trough and are displaceable to the second trough for indication of a predetermined number of months of unacceptable social behavior upon dispacement of one said fifth loop spheres from the first trough to the second trough,
   and
   the first housing includes a first housing cavity therewithin, and wherein the first loop includes a first loop pictorial plate adjacent a first loop first end and a translucent first loop second pictorial plate adjacent a first loop second pictorial end, and an illumination bulb contained within the upper housing, and a first switch means in operative communication with the illumination bulb to effect illumination therewithin for effecting illumination through the first pictorial plate and the second pictorial plate, and the first loop is formed of a hollow translucent tubular material and the first loop first end is positioned adjacent the illumination bulb to direct illumination through the first loop.

* * * * *